(12) United States Patent
Kuroda et al.

(10) Patent No.: US 12,230,793 B2
(45) Date of Patent: Feb. 18, 2025

(54) NEGATIVE ELECTRODE FOR NONAQUEOUS ELECTROLYTE SECONDARY BATTERIES

(71) Applicant: Panasonic Intellectual Property Management Co., Ltd., Osaka (JP)

(72) Inventors: Yuta Kuroda, Osaka (JP); Ryo Kazama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 655 days.

(21) Appl. No.: 17/442,051

(22) PCT Filed: Feb. 17, 2020

(86) PCT No.: PCT/JP2020/006121
§ 371 (c)(1),
(2) Date: Sep. 22, 2021

(87) PCT Pub. No.: WO2020/195334
PCT Pub. Date: Oct. 1, 2020

(65) Prior Publication Data
US 2022/0190328 A1 Jun. 16, 2022

(30) Foreign Application Priority Data
Mar. 28, 2019 (JP) .................. 2019-064823

(51) Int. Cl.
*H01M 4/38* (2006.01)
*H01M 4/02* (2006.01)
(Continued)

(52) U.S. Cl.
CPC .......... *H01M 4/386* (2013.01); *H01M 4/133* (2013.01); *H01M 4/134* (2013.01); *H01M 4/366* (2013.01);
(Continued)

(58) Field of Classification Search
CPC ........... H01M 4/02; H01M 4/13; H01M 4/36; H01M 4/362; H01M 4/364; H01M 4/62;
(Continued)

(56) References Cited

U.S. PATENT DOCUMENTS 3,481,785 A * 12/1969 Shinichi .................. H01M 4/56
429/215
6,413,672 B1 * 7/2002 Suzuki ................... H01M 4/621
429/231.95
(Continued)

FOREIGN PATENT DOCUMENTS

CN 101350407 A * 1/2009 ............. C01B 32/20
CN 102651476 A 8/2012
(Continued)

OTHER PUBLICATIONS

Qiu et al., CN 106025283 Machine Translation (Year: 2016).*
(Continued)

*Primary Examiner* — Ula C Ruddock
*Assistant Examiner* — Anna Korovina
(74) *Attorney, Agent, or Firm* — WHDA, LLP

(57) ABSTRACT

A negative electrode for a non-aqueous electrolyte secondary battery including a negative electrode mixture layer including a negative electrode active material and a negative electrode additive, the negative electrode active material including a carbon material and a Si-containing material, the content of the Si-containing material in the negative electrode mixture layer being 5 mass % or more, and the negative electrode additive including a formaldehyde condensate of an aromatic organic acid having a hydroxyl group and/or an aromatic organic acid salt having a hydroxyl group.

10 Claims, 1 Drawing Sheet

(51) Int. Cl.
*H01M 4/133* (2010.01)
*H01M 4/134* (2010.01)
*H01M 4/36* (2006.01)
*H01M 4/583* (2010.01)
*H01M 4/62* (2006.01)
*H01M 10/0525* (2010.01)
*H01M 10/0568* (2010.01)
*H01M 10/0569* (2010.01)

(52) U.S. Cl.
CPC ........... *H01M 4/583* (2013.01); *H01M 4/622* (2013.01); *H01M 10/0525* (2013.01); *H01M 10/0568* (2013.01); *H01M 10/0569* (2013.01); *H01M 2004/027* (2013.01); *H01M 2300/0037* (2013.01)

(58) Field of Classification Search
CPC ........ H01M 4/628; H01M 4/386; H01M 4/38; H01M 4/134; H01M 4/133; H01M 50/502; H01M 50/545; H01M 50/543; H01M 50/528; H01M 50/296; Y02E 60/10; C08L 61/14; C08G 8/18; C08G 8/24
See application file for complete search history.

(56) References Cited

U.S. PATENT DOCUMENTS

| | | | | |
|---|---|---|---|---|
| 2006/0222952 A1* | 10/2006 | Kono | ................. | H01M 4/5825 |
| | | | | 429/231.95 |
| 2014/0356708 A1 | 12/2014 | Arikawa et al. | | |
| 2014/0356709 A1 | 12/2014 | Arikawa et al. | | |
| 2016/0020466 A1* | 1/2016 | Ulbrich | ................. | H01M 4/525 |
| | | | | 252/511 |
| 2016/0087278 A1* | 3/2016 | Hotta | ................. | H01M 4/386 |
| | | | | 252/511 |
| 2017/0012282 A1* | 1/2017 | Kondo | ................. | H01M 4/134 |
| 2017/0271681 A1 | 9/2017 | Arikawa et al. | | |
| 2018/0026298 A1 | 1/2018 | Hasegawa et al. | | |
| 2018/0069233 A1* | 3/2018 | Matus | ................. | H01M 4/04 |

FOREIGN PATENT DOCUMENTS

| | | | | |
|---|---|---|---|---|
| CN | 106025283 A | * | 10/2016 | ........ H01M 10/0525 |
| CN | 106229479 A | | 12/2016 | |
| CN | 106257721 A | * | 12/2016 | ........ H01M 10/0568 |
| CN | 107408725 A | | 11/2017 | |
| CN | 109301248 A | | 2/2019 | |
| EP | 2816642 A1 | | 12/2014 | |
| JP | 2011100594 A | * | 5/2011 | |
| JP | 2014-139910 A | | 7/2014 | |
| JP | 2014192064 A | * | 10/2014 | ........ H01M 10/052 |
| WO | 2013/122115 A1 | | 8/2013 | |
| WO | WO-2017149871 A1 | * | 9/2017 | ............. H01M 4/14 |

OTHER PUBLICATIONS

Kogure et al., WO 2017149871 Machine Translation (Year: 2017).*
Deng et al., CN-109301248 Machine Translation (Year: 2019).*
Ryosuke JP-2011100594 Machine Translation (Year: 2011).*
Kazuyuki JP-2014192064 Machine Translation (Year: 2014).*
Chang CN-106257721 Machine Translation (Year: 2016).*
Eguchi CN-101350407 Machine Translation (Year: 2009).*
English Translation of International Search report dated May 12, 2020, issued in counterpart Application No. PCT/JP2020/006121. (2 pages).
English translation of Search Report dated Dec. 22, 2023, issued in counterpart CN Application No. 202080018545.9. (3 pages).

* cited by examiner

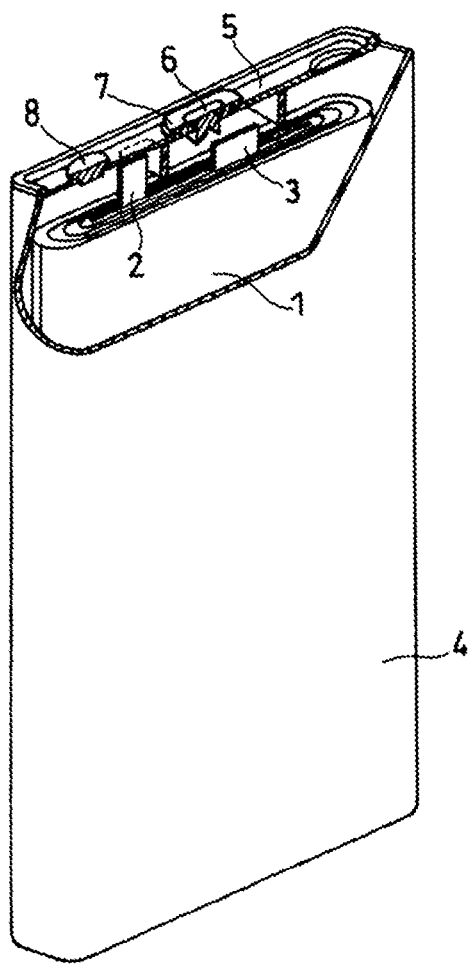

NEGATIVE ELECTRODE FOR NONAQUEOUS ELECTROLYTE SECONDARY BATTERIES

TECHNICAL FIELD

The present invention relates to a negative electrode for a non-aqueous electrolyte secondary battery including a carbon material and a Si-containing material.

BACKGROUND ART

Non-aqueous electrolyte secondary batteries, especially lithium-ion secondary batteries, are expected as a power source for small consumer applications, power storage devices and electric vehicles because of their high voltage and high energy density. With the need for high-energy density of batteries, the use of silicon (Si)-containing materials alloying with lithium is expected as a negative electrode active material with a high theoretical capacity density.

On the other hand, PTL 1 proposes a negative electrode active material for a non-aqueous secondary battery containing an active material (A) capable of inserting and desorbing lithium ions and an organic compound (B). The organic compound (B) is sparingly soluble in a non-aqueous liquid electrolyte, has a π-conjugated structure, and has an electric conductivity of 0.1 S/cm or less at 25° C. It is described that the organic compound (B) suppresses the reaction between the active material (A) and the non-aqueous liquid electrolyte and effectively suppresses the generation of gas.

CITATION LIST

Patent Literature

[PTL 1] International Publication No. WO2013/122115

SUMMARY OF INVENTION

Technical Problem

When a carbon material and a Si-containing material are used in combination, the volume change of the Si-containing material with the charge and discharge is large. Therefore, the conductive path connecting the carbon material and the Si-containing material is decreased, and the conductivity of the negative electrode mixture layer tends to decrease. Particularly, when the content of the Si-containing material in the negative electrode mixture layer becomes 1 mass % or more, the decrease in the conductive path becomes remarkable, and the initial charge and discharge efficiency tends to decrease.

Solution to Problem

In view of the above, one aspect of the present invention relates to a negative electrode for a non-aqueous electrolyte secondary battery including a negative electrode mixture layer including a negative electrode active material and a negative electrode additive, wherein the negative electrode active material includes a carbon material and a Si-containing material, the content of the Si-containing material in the negative electrode mixture layer is 1 mass % or more, and the negative electrode additive includes a formaldehyde condensate of an aromatic organic acid having a hydroxyl group and/or an aromatic organic acid salt having a hydroxyl group.

Advantageous Effects of Invention

The decrease in the initial charge and discharge efficiency of the non-aqueous electrolyte secondary battery is suppressed.

While the novel features of the invention are set forth in the appended claims, the invention relates both to configuration and content and will be better understood by the following detailed description taken in conjunction with other objects and features of the invention and collating the drawings.

BRIEF DESCRIPTION OF DRAWING

FIG. 1 A partially notched schematic oblique view of a non-aqueous electrolyte secondary battery of one embodiment of the present invention.

DESCRIPTION OF EMBODIMENTS

The negative electrode for a non-aqueous electrolyte secondary battery of an embodiment of the invention includes a negative electrode mixture layer including a negative electrode active material and a negative electrode additive. The negative electrode active material includes a carbon material and a Si-containing material. The content of the Si-containing material in the negative electrode mixture layer is 1 mass % or more. By setting the content of the Si-containing material to 1 mass % or more, a remarkable improvement in the theoretical capacity of the negative electrode can be expected.

The content of the Si-containing material in the negative electrode mixture layer of 1 mass % or more may suffice, but from the viewpoint of improving the theoretical capacity of the negative electrode, it is desirable that the content of the Si-containing material is higher, and may be 5 mass % or more, or 10 mass % or more, or even 15 mass % or more. However, since the Si-containing material has a large volume change with charge and discharge, it is difficult to use the Si-containing material alone as the negative electrode active material.

By using a carbon material and a Si-containing material in combination, the overall volume change of the negative electrode mixture layer can be greatly alleviated. The content of the Si-containing material in the negative electrode mixture layer is preferably, for example, 15 mass % or less. In other words, the content of the Si-containing material contained in the negative electrode mixture layer is preferably 1 mass % or more and 15 mass % or less, and more preferably 5 mass % or more and 10 mass % or less.

When a carbon material and a Si-containing material are used in combination in the negative electrode mixture layer, with the increase of the amount of the Si-containing material, the initial charge and discharge efficiency tends to decrease. This is considered due to the formation of voids around the Si-containing material when the Si-containing material shrinks by discharge after expanded by charge. Due to the formation of voids, the contact between the Si-containing material and the surrounding carbon material (that is, the conductive path between the carbon material and the Si-containing material) decreases, and a part of the Si-containing material may be isolated. The isolated Si-containing materials are difficult to discharge.

(Formaldehyde Condensate)

When a formaldehyde condensate of an aromatic organic acid having a hydroxyl group and/or an aromatic organic acid salt having a hydroxyl group (hereinafter, also referred to as an aromatic organic acid (salt) having a hydroxyl group, or simply referred to as a formaldehyde condensate) is contained in the negative electrode mixture layer, reduction in the conductive path between the carbon material and the Si-containing material is suppressed. The formaldehyde condensate generally has a structure in which aromatic rings of an aromatic compound are crosslinked with methylene groups. Here, the formaldehyde condensate has a structure in which an aromatic organic acid (salt) having a hydroxyl group is crosslinked with methylene groups. The hydroxyl group is preferably a phenolic hydroxyl group bonded to an aromatic ring. The number of the hydroxyl group bonded to an aromatic ring is not limited, but is preferably 1 or 2.

The formaldehyde condensate may be a condensate containing either one of an aromatic organic acid having a hydroxyl group and an aromatic organic acid salt having a hydroxyl group, and may be a condensate containing both an aromatic organic acid having a hydroxyl group and an aromatic organic acid salt having a hydroxyl group.

In the formaldehyde condensate, the organic acid group and/or organic acid salt group contributes to an improvement in solubility of the formaldehyde condensate in the negative electrode slurry and an improvement in electrochemical stability. Further, since the aromatic ring has a π-conjugated structure, it has high affinity for a carbon material and can be strongly bonded to a carbon material such as graphite as a negative electrode active material or a carbon material as a conductive auxiliary agent. Further, since the hydroxyl group bonded to the aromatic ring can form a hydrogen bond with a hydroxyl group (e.g., a silanol group) present on the surface of the Si-containing material, it has high affinity for the Si-containing material and can be strongly bonded to the Si-containing material. As described above, the formaldehyde condensate has an action of connecting the carbon material and the Si-containing material and assisting the binding of both of them. Therefore, a conductive path between the carbon material and the Si-containing material is easily maintained even after the first charge and discharge, and a decrease in charge and discharge efficiency is suppressed. Not only the first charge and discharge efficiency, but also the capacity maintenance ratio at an early stage of charge and discharge cycles greatly improves.

Note that, since the organic acid group and/or the organic acid salt group having a strong electron-withdrawing group such as a O=S=O group and a C=O group is considered hardly to contribute to hydrogen bonding with the surface hydroxyl group of the Si-containing material.

An organic acid refers to an organic compound having an ionic group capable of releasing a proton in water to produce an anion. Examples of the ionic group include a sulfonic acid group, a carboxylic acid group, a phosphate group, a phosphonic acid group, and the like. Further, the organic acid salt is a salt having a structure obtained by replacing proton of the ionic group of the organic acid with a metal cation, which may be a lithium salt, a sodium salt, a potassium salt, an ammonium salt, a calcium salt, a magnesium salt and the like. However, the ionic group may be present as an anion in the battery. Among the organic acids, a sulfonic acid is preferred in view of excellent solubility, stability, and the like, and the organic acid salt is preferably a sulfonic acid salt or the like.

As the aromatic ring of the aromatic organic acid, an aromatic ring having a skeleton of furan, pyrrole, imidazole, thiophene, phosphole, pyrazole, oxazole, isoxazole, thiazole, benzene, pyridine, pyrazine, pyrimidine, pyridazine, triazine, benzofuran, isobenzofuran, indole, isoindole, benzophosphole, benzoimidazole, purine, indazole, benzooxazole, benzoisoxazole, benzothiazole, naphthalene, quinoline, isoquinoline, quinoxaline, quinazoline, cinnoline, anthracene, pyrene, and the like are cited. Among them, an aromatic ring having a skeleton of benzene, naphthalene, or the like is preferred in consideration of ease of availability.

Specific examples of the aromatic organic acid having a hydroxyl group and its salt (hereinafter, each also referred to as an organic acid (salt) and the like) include phenolsulfonic acid (salt), salicylic acid (salt), phthalic acid (salt), cresolsulfonic acid (salt), naphtholsulfonic acid (salt), catecholsulfonic acid (salt), benzylalcoholsulfonic acid (salt), aminonaphtholsulfonic acid (salt), lignin sulfonic acid (salt), and the like. Further, the salt includes a sodium salt, a lithium salt, a potassium salt, an ammonium salt, a calcium salt, a magnesium salt and the like. Among them, phenolsulfonic acid salt (e.g., Na phenolsulfonate, Li phenolsulfonate, and the like) are preferred in terms of easy availability and inexpensive. It is preferable that 10 mol % or more, or even 30 mol % or more (e.g., 50 mol % or more) of the unit of the aromatic compound constituting the formaldehyde condensate is at least one selected from the group consisting of sodium phenolsulfonate and lithium phenolsulfonate. One kind of formaldehyde condensate may be used alone, and two or more kinds thereof may be used in combination.

The formaldehyde condensate may include an aromatic compound other than the aromatic organic acid (salt) having a hydroxyl group as a unit of an aromatic compound. In other words, the formaldehyde condensate may be a copolymer of an aromatic organic acid (salt) having a hydroxyl group and an aromatic compound not having at least one of the above ionic group and hydroxyl group. However, it is desirable that 20 mol % or more of the aromatic compound constituting the formaldehyde condensate, or even 50 mol % or more (e.g., 80 mol % or more) is the aromatic organic acid (salt) having a hydroxyl group.

Note that examples of the aromatic compound not having at least one of an ionic group and a hydroxyl group include aniline, anilinesulfonic acid, benzoic acid, naphthalene, anthracene, phenanthrene, toluene, ethylbenzene, xylene, styrene, and cumene.

The weight-average molecular weight of the formaldehyde condensate may be, for example, 1000 or more and 1 million or less, and may be 2000 or more and 0.5 million or less, and may be 2500 or more and 0.3 million or less (e.g., 0.2 million or less). Note that the weight-average molecular weight is a weight average molecular weight in terms of standard polystyrene conversion measured by gel permeation chromatography (GPC) using tetrahydrofuran (THF) as a solvent, or is a weight-average molecular weight in terms of standard polyethylene glycol conversion measured by GPC using water, dimethylformamide (DMF) or dimethylsulfoxide (DMSO) as a solvent.

As a preferred example of the formaldehyde condensate, a structural formula of a formaldehyde condensate of sodium phenolsulfonate is shown below.

[Chemical formula 1]

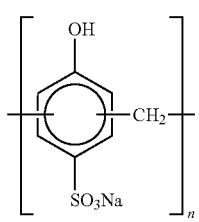

The content of the formaldehyde condensate in the negative electrode mixture layer may be, for example, 0.01 mass % or more and 10 mass % or less, and may be 5 mass % or more and 7 mass % or less, taking into account the balance between the high capacity of the negative electrode and the initial charge and discharge efficiency.

(Negative Electrode Active Material)

A negative electrode active material refers to a material contained in the negative electrode and capable of absorbing and releasing lithium ions electrochemically. Here, the negative electrode active material includes a carbon material and a Si-containing material, each of which is capable of absorbing and releasing lithium ions electrochemically.

The Si-containing material includes, for example, a lithium-ion conductive phase and Si particles dispersed in the lithium-ion conductive phase. The lithium-ion conductive phase may be at least one selected from the group consisting of a silicon oxide phase, a silicate phase and a carbon phase. Specifically, as the Si-containing material, for example, at least one selected from the group consisting of the following first composite material, second composite material, and third composite material may be used.

<First Composite Material>

The first composite material includes a silicon oxide phase and first Si particles dispersed in the silicon oxide phase. The first composite material is excellent in that the stability is high and the volume change is small among Si-containing materials. It is considered that the high stability is due to the particle diameter of the first Si particles dispersed in the silicon oxide phase that is small and difficult to cause deep charge. The silicon oxide phase has relatively many sites that irreversibly trap lithium ions and tends to have a large irreversible capacity among the Si-containing materials. In other words, the first composite material may have a larger irreversible capacity than the second composite material. Trapping of lithium ions by the silicon oxide phase is considered to also contribute to enhance the stability of the structure of the first composite material and suppress the volume change.

The first composite material can be obtained, for example, by heating a silicon oxide in a non-oxidizing atmosphere having an inert gas such as argon and performing a disproportionation reaction. In the disproportionation reaction, microcrystals of Si can be uniformly produced in the silicon oxide phase. The size of the Si particles generated by the disproportionation reaction is small, and for example, the average particle diameter can be less than 100 nm, and can be in the range of 5 nm to 50 nm. The main component of the silicon oxide phase (e.g., 95 to 100 mass %) can be silicon dioxide. That is, the first composite material may include a $SiO_2$ phase and first Si particles dispersed in the $SiO_2$ phase. In this instance, the first composite material, as a whole, can be represented by the general formula: $SiO_x$. The range of x value may be $0<x<2$, but may be preferably $0.9 \leq x \leq 1.1$, and may be $x=1$.

The average particle diameter of the first composite material may be 1 to 20 μm, and is preferably 5 to 12 μm. In the above particle diameter range, the stress due to the volume change of the Si-containing material with charge and discharge is easily relaxed, and it becomes easy to obtain good cycle characteristics.

<Second Composite Material>

The second composite material includes a silicate phase and second Si particles dispersed in the silicate phase.

The silicate phase may include, for example, at least one selected from the group consisting of the group 1 elements and the group 2 elements of the long period type periodic table. As the group 1 elements and the group 2 elements of the long period type periodic table, for example, lithium (Li), potassium (K), sodium (Na), magnesium (Mg), calcium (Ca), strontium (Sr), barium (Ba), or the like can be used. Other elements such as aluminum (Al), boron (B), lanthanum (La), phosphorus (P), zirconium (Zr), titanium (Ti), and the like may be included. Among them, a silicate phase containing lithium (hereinafter, also referred to as a lithium silicate phase) is preferred because of its small irreversible capacity and high initial charge and discharge efficiency. That is, the second composite material may include a lithium silicate phase and second Si particles dispersed in the lithium silicate phase. The second composite material including a lithium silicate phase and second Si particles dispersed in the lithium silicate phase is hereinafter also referred to as LSX.

The lithium silicate phase may be an oxide phase containing lithium (Li), silicon (Si), and oxygen (O), and may contain other elements. Atomic ratio of O to Si in the lithium silicate phase: O/Si is, for example, greater than 2 and less than 4. In this case, it is advantageous in terms of stability and lithium ion conductivity. Preferably, O/Si is greater than 2 and less than 3. Atomic ratio of Li to Si in the lithium silicate phase: Li/Si is, for example, greater than 0 and less than 4. Examples of elements other than Li, Si and O which may be contained in the lithium silicate phase include iron (Fe), chromium (Cr), nickel (Ni), manganese (Mn), copper (Cu), molybdenum (Mo), zinc (Zn), aluminum (Al), and the like.

The lithium silicate phase may have a composition represented by the formula: $Li_{2z}SiO_{2+z}$ ($0<z<2$). From the viewpoint of stability, ease of fabrication, lithium ion conductivity, and the like, z preferably satisfies $0<z<1$, and more preferably $z=1/2$.

<Third Composite Material>

The third composite material includes a carbon phase and third Si particles dispersed in the carbon phase (hereinafter, the third composite material is also referred to as an Si—C material).

The carbon phase may be composed of, for example, amorphous carbon having low crystallinity. The amorphous carbon may be, for example, hard carbon, soft carbon, or otherwise. An amorphous carbon can be obtained, for example, by sintering a carbon source under an inert atmosphere and pulverizing the obtained sintered body. The Si—C material can be obtained, for example, by mixing a carbon source and Si particles, stirring the mixture while crushing the mixture with a stirrer such as a ball mill, and then firing the mixture in an inert atmosphere. As the carbon source, for example, a saccharide or a water-soluble resin such as carboxy methylcellulose (CMC), polyvinylpyrrolidone, cellulose, sucrose or the like may be used. When the carbon source and Si particles are mixed, for example, the carbon source and the Si particles may be dispersed in a dispersion medium such as alcohol.

The content of the second Si particles contained in the second composite material and the content of the third Si particles contained in the third composite material may be, for example, 40% by weight or more and 80% by weight or less, respectively. In this case, it is easy to achieve both high capacity and improved cycle characteristics of the battery. Unlike the first composite material that the manufacturing method to obtain is limited, in the second composite material and the third composite material, since the content of the second Si particles and the third Si particles can be arbitrarily changed, it is easy to design a high-capacity negative electrode. By using the first composite material and the second and/or third composite material in combination and controlling the distribution of these in the negative electrode mixture layer, it is possible to achieve both good cycle characteristics and high capacity even when the utilization ratio of Si is increased.

The second and third composite materials are superior in that the irreversible capacity is small. This is because the silicate phase and the carbon phase have small number of sites that irreversibly trap lithium ions. By using the second and/or third composite material, excellent charge and discharge efficiency can be obtained. Especially, the effect is remarkable in an early stage of charge and discharge.

The average particle diameters of the second and third Si particles are, for example, 500 nm or less, may be 400 nm or less, and may be 200 nm or less, respectively. By having such a large average particle diameter, the Si particles can easily increase the capacity of the second and third composite materials. On the other hand, if it is 500 nm or less, the volume change of the second and third Si particles during charge and discharge becomes relatively small, and the structural stabilities of the second and third composite materials are improved. Here, the average particle diameters of the second and third Si particles are a value after at least an elapse of the first charge.

The Si particles dispersed in the silicate phase and/or the carbon phase are usually composed of a plurality of crystallites. The crystallite size of the Si particles is preferably, for example, 30 nm or less. In this case, since the volume change due to the expansion and contraction of the Si particles with the charge and discharge can be reduced as much as possible, the cycle characteristics are further enhanced. For example, since voids that might be formed around the Si particles during contraction of the Si particles and isolations of the Si particles caused by reduction of the contact between the Si particles and its periphery are suppressed, decrease in charge and discharge efficiency is suppressed. The lower limit value of the crystallite size of the Si particles is not particularly limited, but is, for example, 5 nm or more. The crystallite size may be 10 nm or more and 30 nm or less, and may be 15 nm or more and 25 nm or less.

The average particle diameter of the second and third composite materials may be 1 to 20 μm, and may be 5 to 12 μm, respectively. In the above particle diameter range, the stress due to the volume change of the Si-containing material with charge and discharge is easily relaxed, and it is easy to obtain good cycle characteristics.

The content of the Si particles contained in each Si-containing material (each composite material) can be measured by Si-NMR. Desirable measuring conditions for Si-NMR are shown below.

Measuring device: solid-state nuclear magnetic resonance spectrum measuring device (INOVA-400) manufactured by Varian Co., Ltd.
Probe: Varian 7 mm CPMAS-2
MAS: 4.2 kHz
MAS speed: 4 kHz
Pulse: DD (45° pulse+signal capture time 1H decouple)
Repeat time: 1200 sec
Observation width: 100 kHz
Observation center: around −100 ppm
Signal uptake time: 0.05 sec
Accumulated number: 560
Sample Quantity: 207.6 mg The average particle diameter of the Si particles contained in each Si-containing material (each composite material) can be measured from a cross-sectional SEM (scanning electron microscope) photograph of the Si-containing material. Specifically, the average particle diameter of the Si particles is determined by averaging the maximum diameter of arbitrarily selected 100 Si particles.

The crystallite size of the Si particles is calculated from the half-width of the diffraction peak assigned to the Si (111) plane of the X-ray diffraction (XRD) pattern of the Si particles by the equation of Sheller.

The average particle diameter of each Si-containing material (each composite material) means a particle size when the integrated volume value is 50% (volume average particle size) in the particle size distribution measured by a laser diffraction scattering method. For example, "LA-750" manufactured by Horiba Co., Ltd (HORIBA) can be used as the measuring device.

Note that the composition of the second composite material can be analyzed by, for example, the following method.

The battery is disassembled, the negative electrode is taken out, washed with a non-aqueous solvent such as ethylene carbonate, and dried, and then cross-sectional processing of the negative electrode mixture layer is performed by a cross-section polisher (CP) to obtain a sample. Field emission scanning electron microscopy (FE-SEM) is used to obtain a reflected electron image of the sample cross-section and to observe the cross-section of the second composite material. Qualitative and quantitative analyses of the elements can be performed for the observed second composite material using Auger electron spectroscopy (AES) analyzer (acceleration voltage 10 kV, beam current 10 nA).

For example, in the case of LSX represented by $Li_{2z}SiO_{2+z}$, the ratio of 2z and (2+z) may be determined from the obtained lithium (Li) content and oxygen (O) content.

Note that, in the above-described cross-sectional observation and analyses of the sample, a carbon sample stage may be used for fixing the sample in order to prevent diffusion of Li. In order not to alter the sample cross section, a transfer vessel which holds and conveys the sample without exposure to the atmosphere may be used.

The Si-containing material may have a conductive material that coats at least a portion of its surface. It is particularly desirable that an LSX material in which the lithium-ion conductive phase is a silicate phase having poor electron conductivity be coated at their surface with a conductive material to enhance the conductivity.

<Carbon Material>

A carbon material has a smaller degree of expansion and contraction during charge and discharge than the Si-containing material. Therefore, it is easy to improve the cycle characteristics of the battery by using the carbon material together with the Si-containing material. The content of the carbon material (excluding the carbon phase as the lithium-ion conductive phase) in the negative electrode active material may be, for example, 85 mass % or more and 99 mass % or less. In other words, the content of the Si-containing material in the negative electrode active material may be 1 mass % or more and 15 mass % or less. In this case, it is easy to achieve both high capacity and improved cycle characteristics.

Examples of the carbon material include graphite, easily graphitized carbon (soft carbon), hardly graphitized carbon (hard carbon), and the like. Preferred among them is graphite, which is excellent in stability during charge and discharge and has small irreversible capacity. Graphite means a material having a graphite-type crystal structure, examples of which include natural graphite, artificial graphite, graphitized mesophase carbon particles. The carbon material may be used singly or in combination of two or more.

The ratio of the mass Wc of the carbon material contained in the negative electrode mixture layer to the mass Ws of the Si-containing material contained in the negative electrode mixture layer: Wc/Ws may be, for example, 9.5 to 99, and may be 6.3 to 99. Note that the carbon phase of the third composite material is not included in the mass Wc of the carbon material.

Next, a secondary battery according to an embodiment of the present invention is described. The secondary battery includes, for example, a negative electrode as follows, a positive electrode, and a non-aqueous electrolyte.

[Negative Electrode]

The negative electrode includes a negative electrode active material capable of absorbing and releasing lithium ions electrochemically. The negative electrode includes a negative electrode current collector and a negative electrode mixture layer. The negative electrode mixture layer can be formed, for example, by coating a negative electrode slurry in which a negative electrode mixture containing the negative electrode active material is dispersed in a dispersion medium on a surface of the negative electrode current collector and drying it. The dry applied film may be rolled, if necessary. The negative electrode mixture layer may be formed on one surface of the negative electrode current collector, or on both surfaces thereof.

The negative electrode mixture contains the negative electrode active material as an essential component, and as an optional component, a binder, a conductive auxiliary agent, a thickener, or the like can be included.

As the negative electrode current collector, a non-porous conductive substrate (metal foil, etc.), a porous conductive substrate (mesh-body, net-body, punched sheet, etc.) is used. As the material of the negative electrode current collector, stainless steel, nickel, nickel alloy, copper, copper alloy or the like can be exemplified. The thickness of the negative electrode current collector is not particularly limited, but is, for example, 1 to 50 µm, and may be 5 to 20 µm.

As the binder, resin materials, for example, fluorine resins such as polytetrafluoroethylene and polyvinylidene fluoride (PVDF); polyolefin resins such as polyethylene and polypropylene; polyamide resins such as aramid resins; polyimide resins such as polyimide and polyamideimide; acrylic resins such as polyacrylic acid, polymethyl acrylate, and ethylene-acrylic acid copolymers; vinyl resins such as polyacrylonitrile and polyvinyl acetate; polyvinylpyrrolidone; polyethersulfone; rubbery materials such as styrene-butadiene copolymer rubber (SBR), and the like, can be exemplified. These may be used singly or in combination of two or more.

Examples of the conductive auxiliary agent include carbon blacks such as acetylene black, carbon nanotubes (hereinafter, also referred to as CNT), metal fibers, carbon fluoride, metal powders, conductive whiskers such as zinc oxide and potassium titanate, conductive metal oxides such as titanium oxide, and organic conductive materials such as phenylene derivatives. These may be used singly or in combination of two or more.

Among the conductive auxiliary agents, a CNT is suitable as the conductive auxiliary agent to be used in combination with the Si-containing material. CNTs are fibrous. Therefore, even when a void is formed around the Si-containing material when the expanded Si-containing material by charging is contracted by discharging, the contact point between the Si-containing material and the carbon material is effectively secured. Also, the formaldehyde condensate has high affinities for both the CNT and the negative electrode active material. Therefore, by using a CNT, the effect of suppressing the reduction of the conductive path in the negative electrode mixture layer is remarkably improved. It is considered that the formaldehyde condensate not only secures the contact point between the Si-containing material and the carbon material but also serves to reinforce the conductive path between the CNT and the negative electrode active material.

From the viewpoint of ensuring a more excellent conductive path, the average length of the CNT may be, for example, 1 µm or more and 100 µm or less, and is preferably 3 µm or more and 10 µm or less. Similarly, the average diameter of the CNT may be, for example, 1 nm or more and 30 nm or less, and is preferably 1 nm or more and 5 nm or less.

The average length and average diameter of the CNT are determined by image analysis using scanning electron microscopy (SEM). Specifically, 50 CNTs are arbitrarily selected to measure the length and diameter, and the values are averaged. The length of the CNT refers to the length when the CNT is stretched in a straight line.

The content of the CNT in the negative electrode mixture may be, for example, 0.01 mass % or more and 1.0 mass % or less, and may be 0.1 mass % or more and 0.4 mass % or less. In this case, not only the effect of suppressing the reduction in the first charge and discharge efficiency is enhanced, but also the charge and discharge cycle characteristics can be remarkably improved.

[Positive Electrode]

The positive electrode includes a positive electrode active material capable of absorbing and releasing lithium ions electrochemically. The positive electrode includes, for example, a positive electrode current collector, and a positive electrode mixture layer formed on a surface of the positive electrode current collector. The positive electrode mixture layer can be formed by applying a positive electrode slurry including a positive electrode mixture dispersed in a dispersion medium, onto a surface of the positive electrode current collector, and drying it. The dry applied film may be rolled, if necessary. The positive electrode mixture layer may be formed on one surface of the positive electrode current collector, or on both surfaces thereof. The positive electrode mixture contains a positive electrode active material as an essential component, and as an optional component, a binder, a conductive auxiliary agent, or the like can be included.

As the positive electrode active material, for example, a lithium-containing composite oxide can be used. For example, $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, $Li_2MPO_4F$ (M is at least one selected from the group consisting of Na, Mg, Sc, Y, Mn, Fe, Co, Ni, Cu, Zn, Al, Cr, Pb, Sb and B) can be used. Here, a=0 to 1.2, b=0 to 0.9, and c=2.0 to 2.3. Note that the value "a" indicating the molar ratio of lithium is increased or decreased by charge and discharge.

Among them, a lithium-nickel composite oxide represented by $Li_aNi_bM_{1-b}O_2$ (M is at least one selected from the group consisting of Mn, Co and Al, $0<a\le1.2$, and $0.3\le b\le1$) is preferred. From the viewpoint of increasing the capacity, it is more preferable to satisfy $0.85\le b\le1$. From the viewpoint of stability of the crystal structure, $Li_aNi_bCo_cAl_dO_2$ including Co and Al as M ($0<a\le1.2$, $0.85\le b<1$, $0<c<0.15$, $0<d\le0.1$, and b+c+d=1) is more preferred.

As the binder and the conductive auxiliary agent, those exemplified for the negative electrode can be used. As the conductive auxiliary agent, graphite such as natural graphite or artificial graphite may be used.

The shape and thickness of the positive electrode current collector can be selected from the shapes and ranges according to the negative electrode current collector, respectively. As the material of the positive electrode current collector, for example, stainless steel, aluminum, aluminum alloy, titanium or the like can be exemplified.

[Liquid Electrolyte]

The liquid electrolyte includes a solvent and an electrolytic salt. As the solvent, a non-aqueous solvent may be used, and water may be used. The electrolytic salt includes at least a lithium salt.

The concentration of the lithium salt in the liquid electrolyte is preferably, for example, 0.5 mol/L or more and 2 mol/L or less. By controlling the lithium salt concentration within the above range, a liquid electrolyte having excellent ionic conductivity and moderate viscosity can be obtained. However, the lithium salt concentration is not limited to the above.

As the non-aqueous solvent, for example, a cyclic carbonic acid ester (excluding an unsaturated cyclic carbonic acid ester described later), a chain carbonic acid ester, a cyclic carboxylic acid ester, a chain carboxylic acid ester, or the like is used. Examples of the cyclic carbonic acid ester include propylene carbonate (PC), ethylene carbonate (EC), and the like. Examples of the chain carbonic acid ester include diethyl carbonate (DEC), ethyl methyl carbonate (EMC), dimethyl carbonate (DMC), and the like. Examples of the cyclic carboxylic acid ester include γ-butyrolactone (GBL) and γ-valerolactone (GVL). Examples of the chain carboxylic acid ester include methyl formate, ethyl formate, propyl formate, methyl acetate, ethyl acetate, propyl acetate, methyl propionate, ethyl propionate, and propyl propionate. The non-aqueous solvent may be used singly, or two or more kinds thereof may be used in combination.

Examples of the lithium salt include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, imide salts, and the like. Examples of the borates include lithium bis(1,2-benzenediolate(2-)-O,O')borate, lithium bis(2,3-naphthalenediolate(2-)-O,O')borate, lithium bis(2,2'-biphenyldiolate(2-)-O,O')borate, and lithium bis(5-fluoro-2-olate-1-benzenesulfonic acid-O,O')borate. Examples of the imide salt include lithium bis(fluorosulfonyl)imide (LiN $(FSO_2)_2$: hereinafter, also referred to as LFSI)), lithium bis(trifluoromethylsulfonyl) imide (LiN $(CF_3SO_2)_2$), lithium trifluoromethylsulfonyl nonafluorobutylsulfonyl imide (LiN $(CF_3SO_2)(C_4F_9SO_2)$), lithium bis(pentafluoroethylsulfonyl)imide (LiN $(C_2F_5 SO_2)_2$), and the like. Among them, at least one of $LiPF_6$ and LFSI is preferred. The lithium salt may be used singly, or two or more kinds thereof may be used in combination.

The liquid electrolyte may include an additive. As the additive, succinic anhydride, maleic anhydride, ethylene sulfite, fluorobenzene, hexafluorobenzene, cyclohexylbenzene (CHB), 4-fluoroethylene carbonate (FEC), lithium bis (oxalato)borate (LiBOB), adiponitrile, pimeronitrile, and the like can be used. Further, a cyclic carbonic acid ester having at least one unsaturated carbon-carbon bond in the molecule (hereinafter, referred to as an unsaturated cyclic carbonic acid ester) may be included.

Examples of the unsaturated cyclic carbonic acid ester include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate, and divinylethylene carbonate. One kind of the unsaturated cyclic carbonic acid esters may be used alone, and two or more kinds thereof may be used in combination. In the unsaturated cyclic carbonic acid ester, a part of the hydrogen atom may be substituted with a fluorine atom.

[Separator]

Usually, it is desirable to interpose a separator between the positive electrode and the negative electrode. The separator is excellent in ion permeability and has moderate mechanical strength and electrically insulating property. As the separator, a microporous thin film, a woven fabric, a nonwoven fabric, or the like can be used. As a material of the separator, a polyolefin such as polypropylene or polyethylene is preferred.

As an example of the structure of the secondary battery, there may be mentioned a structure in which an electrode group formed by winding the positive electrode and the negative electrode via the separator and the liquid electrolyte are housed in an outer package. Other forms of electrode groups may be applied, such as a stack electrode group in which the positive electrode and the negative electrode are laminated via the separator. The secondary battery may be in any form, for example, in cylindrical, square, coin-shaped, button-shaped, laminated or the like.

Hereinafter, the structure of a square non-aqueous electrolyte secondary battery as an example of the secondary battery according to the present invention is described, referring to FIG. 1. FIG. 1 is a schematic partially notched oblique view of a secondary battery according to an embodiment of the present invention.

The battery includes a bottomed prismatic battery case 4, and an electrode group 1 and a liquid electrolyte (not shown) housed in the battery case 4. The electrode group 1 has a long strip-like negative electrode and a long strip-like positive electrode and a separator interposed and preventing direct contact therebetween. The electrode group 1 is formed by winding the negative electrode, the positive electrode and the separator around a flat core and removing the winding core.

One end of a negative electrode lead 3 is attached to the negative electrode current collector of the negative electrode by welding or the like. The other end of the negative electrode lead 3 is electrically connected to the negative electrode terminal 6 provided on the sealing plate 5 via an insulating plate made of resin (not shown). The negative electrode terminal 6 is insulated from the sealing plate 5 by a resin-made gasket 7. One end of a positive electrode lead 2 is attached to the positive electrode current collector of the positive electrode by welding or the like. The other end of the positive electrode lead 2 is connected to the rear surface of the sealing plate 5 via the insulating plate. That is, the positive electrode lead 2 is electrically connected to the battery case 4 serving as a positive electrode terminal. The insulating plate separates the electrode group 1 and the sealing plate 5 and separates the negative electrode lead 3 and the battery case 4. The periphery of the sealing plate 5 is fitted to the open end of the battery case 4, and the fitting portion is laser welded. Thus, the opening of the battery case 4 is sealed with the sealing plate 5. An injection hole of the liquid electrolyte provided in the sealing plate 5 is closed by a sealing plug 8.

The present invention will be specifically described below with reference to Examples and Comparative Examples. The present invention, however, is not limited to the following Examples.

Comparative Example 1

[Preparation of Negative Electrode]

$SiO_x$ (x=1) with an average particle diameter of 5 μm was prepared as a Si-containing material. $SiO_x$ includes a $SiO_2$ phase and first Si particles dispersed in the $SiO_2$ phase. The content of the first Si particles contained in the first Si containing material ($SiO_x$) was 50 mass %. The average particle diameter of the first Si particles was 20 nm.

A conductive layer was formed on the surface of $SiO_x$. The amount of the conductive layer was 5 mass % with respect to the total mass of the Si-containing material and the conductive layer. Specifically, $SiO_x$ was mixed with a coal pitch, and the mixture was calcined in an inert atmosphere at 800° C., thereby the surface of $SiO_x$ was coated with a conductive carbon. Thereafter, $SiO_x$ having the conductive layer was ground and adjusted to an average particle diameter of 5 μm using a sieve.

A negative electrode slurry containing graphite, the $SiO_x$ having the conductive layer, carboxy methylcellulose (CMC), lithium polyacrylate (PAAL), and styrene butadiene rubber (SBR) in a mass ratio of 93:7:0.9:0.5:1 was prepared, and then the negative electrode slurry was applied to the surface of a copper foil which is a negative electrode current collector so that the mass of the negative electrode mixture per 1 $m^2$ became 200 g. Thereafter, the coating film was dried and then rolled to form a negative electrode mixture layer having a density of 1.5 $g/cm^3$ on each of both surfaces of the copper foil to obtain a negative electrode.

[Preparation of Positive Electrode]

A lithium nickel composite oxide ($LiNi_{0.8}Co_{0.18}Al_{0.02}O_2$), acetylene black, and polyvinylidene fluoride were mixed at a mass ratio of 95:2.5:2.5, and N-methyl-2-pyrrolidone (NMP) was added thereto, followed by stirring using a mixer to prepare a positive electrode slurry. Next, the positive electrode slurry was applied to the surface of an aluminum foil, and the coating film was dried, and then rolled to form a positive electrode mixture layer having a density of 3.6 $g/cm^3$ on each of both surfaces of the aluminum foil to obtain a positive electrode.

[Preparation of Liquid Electrolyte]

A liquid electrolyte was prepared by dissolving a lithium salt in a non-aqueous solvent. As the non-aqueous solvent, a mixed solvent containing ethylene carbonate (EC), dimethyl carbonate (DMC), ethyl methyl carbonate (EMC), and fluoroethylene carbonate (FEC) in a volume ratio of 20:70: 5:5 was used. $LiPF_6$ was used for the lithium salt. The $LiPF_6$ concentration in the liquid electrolyte was set to 1.35 mol/L.

[Fabrication of Non-Aqueous Electrolyte Secondary Battery]

The positive electrode and the negative electrode, with a tab attached to each electrode, were wound spirally with a separator interposed therebetween such that the tabs were positioned at the outermost layer, thereby to form an electrode group. The electrode group was inserted into an exterior body made of an aluminum laminate film, dried under vacuum at 105° C. for 2 hours, and then the liquid electrolyte was injected thereinto and the opening of the exterior body was sealed to obtain Battery B1 of Comparative Example 1.

Example 1

A formaldehyde condensate ($PhSO_3Na$: weight-average molecular weight: 8000) of sodium phenolsulfonate represented by the following general formula:

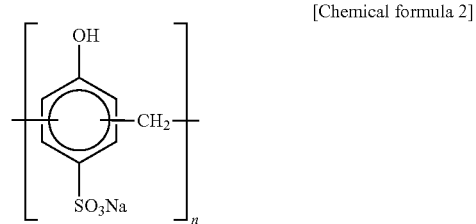

[Chemical formula 2]

as an additive was added to the negative electrode slurry at a ratio of 0.5 mass % relative to the sum of graphite, $SiO_x$, CMC, PAAL, SBR and $PhSO_3Na$. Except for the above, a negative electrode was prepared in the same manner as in Comparative Example 1 and used to prepare Battery A1, and the evaluation was conducted in the same manner.

Example 2

A carbon nanotube (CNT: average length 10 μm, average diameter 7 nm) as a conductive auxiliary agent was added to the negative electrode slurry at a ratio of 0.3 mass % relative to the sum of graphite, $SiO_x$, CMC, PAAL, SBR, $PhSO_3Na$ and CNT. Except for the above, a negative electrode was prepared in the same manner as in Example 1 and used to prepare Battery A2, and the evaluation was conducted in the same manner.

Comparative Example 2

A copolymer of sodium maleate as an aliphatic polycarboxylate and styrene (RCOONa: weight-average molecular weight: 8000) was added to the negative electrode slurry, instead of $PhSO_3Na$. Except for the above, a negative electrode was prepared in the same manner as in Example 1 and used to prepare Battery B2, and the evaluation was conducted in the same manner.

Comparative Example 3

Sodium tetradecylsulfonate ($TDSO_3Na$: weight-average molecular weight: 300) was added to the negative electrode slurry, instead of $PhSO_3Na$. Except for the above, a negative electrode was prepared in the same manner as in Example 1 and used to prepare Battery B3, and the evaluation was conducted in the same manner.

Comparative Example 4

A formaldehyde condensate of sodium naphthalenesulfonate ($NpSO_3Na$: weight-average molecular weight: 23000) was added to the negative electrode slurry, instead of PhSO$_3$Na. Except for the above, a negative electrode was prepared in the same manner as in Example 1 and used to prepare Battery B4, and the evaluation was conducted in the same manner.

Evaluation was performed on each of Batteries prepared above by the following method.

[Evaluation 1: Initial Charge and Discharge Efficiency]

For each Battery after fabrication, in an ambient of 25° C., constant current charging was performed until the voltage became 4.2 V at a current of 0.2 It, then constant voltage charging was performed until the current became 0.015 It at a constant voltage of 4.2V. Thereafter, constant current discharging was performed until the voltage reached 2.75 V at a current of 0.2 It. The pause period between charge and discharge was 10 minutes. Charge and discharge were carried out under an environment of 25° C. The ratio of the initial discharge capacity to the initial charge capacity at this time was determined as the initial charge and discharge efficiency. Using the result of Battery B1 as a reference, an increase rate relative to the reference value of each of other Batteries is shown in Table 1.

Herein, "(1/X) It" represents a current, and (1/X) It (A)=rated capacity (Ah)/X (h). X represents the time for charging or discharging the electricity corresponding to the rated capacity. For example, 0.5 It means that X=2 and the current value is represented by "rated capacity (Ah)/2 (h)".

[Evaluation 2: Cycle Capacity Maintenance Ratio]

The charge and discharge under the same conditions as in Evaluation 1 were repeated, and the ratio (percentage) of the discharge capacity at the 10th cycle to the discharge capacity at the first cycle was determined as the 10 cycle capacity maintenance ratio. Using the results of Battery B1 as a reference, an increase rate relative to the reference value of each of other Batteries is shown in Table 1.

TABLE 1

| | Additive | Negative electrode active material | | | Initial energy efficiency (%) | 10 cycle capacity maintenance ratio (%) |
|---|---|---|---|---|---|---|
| | | SiO$_x$ | Graphite | CNT | | |
| A1 | PhSO$_3$Na | 7 | 93 | None | 0.1 | 2.3 |
| A2 | PhSO$_3$Na | 7 | 93 | Present | 0.2 | 18.5 |
| B1 | — | 7 | 93 | None | 0 | 0 |
| B2 | RCOONa | 7 | 93 | None | 0 | −0.2 |
| B3 | TDCOONa | 7 | 93 | None | −0.3 | −74.8 |
| B4 | NpSO$_3$Na | 7 | 93 | None | −2.0 | −0.3 |

From Table 1, it can be understood that only Na phenolsulfonate, which is an aromatic organic acid salt having a hydroxyl group, specifically improves the initial charge and discharge efficiency and increases the capacity maintenance ratio at an early stage of the cycles. Further, it can be understood that the use of CNT further dramatically improves the cycle characteristics at an early stage.

INDUSTRIAL APPLICABILITY

The non-aqueous electrolyte secondary battery according to the present invention is useful as a main power supply for a mobile communication device, a portable electronic device or the like.

While the invention has been described with respect to presently preferred embodiments, such disclosure should not be construed as limiting. Various variations and modifications will certainly become apparent to those skilled in the art belonging to the present invention upon reading the above disclosure. Accordingly, the appended claims are to be construed as encompassing all variations and modifications without departing from the true spirit and scope of the invention.

REFERENCE SIGNS LIST

1: Electrode group, 2: Positive electrode lead, 3: Negative electrode lead, 4: Battery case, 5: Sealing plate, 6: Negative electrode terminal, 7: Gasket, 8: Sealing plug

The invention claimed is:

1. A negative electrode for a non-aqueous electrolyte secondary battery including a negative electrode mixture layer including a negative electrode active material and a negative electrode additive,
    the negative electrode active material including a carbon material and a Si-containing material,
    a content of the Si-containing material in the negative electrode mixture layer being 1 mass % or more, and
    the negative electrode additive including a formaldehyde condensate of an aromatic organic acid having a hydroxyl group and/or a formaldehyde condensate of an aromatic organic acid salt having a hydroxyl group.

2. The negative electrode for a non-aqueous electrolyte secondary battery according to claim 1,
    wherein a weight-average molecular weight of the formaldehyde condensate is 1000 or more and 1 million or less.

3. The negative electrode for a non-aqueous electrolyte secondary battery according to claim 1,
    wherein the aromatic organic acid having a hydroxyl group is a hydroxysulfonic acid.

4. The negative electrode for a non-aqueous electrolyte secondary battery according to claim 1,
    wherein the aromatic organic acid salt having a hydroxyl group is a hydroxysulfonic acid salt.

5. The negative electrode for a non-aqueous electrolyte secondary battery according to claim 4,
    wherein the hydroxysulfonic acid salt is at least one selected from the group consisting of sodium hydroxysulfonate and lithium hydroxysulfonate.

6. The negative electrode for a non-aqueous electrolyte secondary battery according to claim 1,
    wherein a content of the formaldehyde condensate contained in the negative electrode mixture layer is 0.01 mass % or more and 10 mass % or less.

7. The negative electrode for a non-aqueous electrolyte secondary battery according to claim 1,
    wherein the content of the Si-containing material contained in the negative electrode mixture layer is 1 mass % to 30 mass %.

8. The negative electrode for a non-aqueous electrolyte secondary battery according to claim 1,
    wherein the Si-containing material includes a lithium-ion conductive phase and Si particles dispersed in the lithium-ion conductive phase, and
    the lithium-ion conductive phase is at least one selected from the group consisting of a silicon oxide phase, a silicate phase and a carbon phase.

9. The negative electrode for a non-aqueous electrolyte secondary battery according to claim 8,
    wherein the silicate phase includes at least one selected from the group consisting of group 1 elements and group 2 elements of long period type periodic table.

10. The negative electrode for a non-aqueous electrolyte secondary battery according to claim 1,
wherein the negative electrode mixture layer contains a carbon nanotube at a content of 0.01 mass % or more and 1.0 mass % or less.

\* \* \* \* \*